United States Patent
Fernihough et al.

[11] Patent Number: 6,131,800
[45] Date of Patent: Oct. 17, 2000

[54] METHOD FOR COATING AND WELDING STATOR VANES OF A GAS TURBINE

[75] Inventors: John Fernihough, Ennetbaden, Switzerland; Alexander Beeck, Küssaberg, Germany; Gordon David Anderson, Baden, Switzerland

[73] Assignee: ABB Alstom Power (Switzerland) Ltd, Baden, Switzerland

[21] Appl. No.: 09/493,135

[22] Filed: Jan. 28, 2000

[30] Foreign Application Priority Data

Nov. 3, 1999 [EP] European Pat. Off. ............ 99811000

[51] Int. Cl.[7] .................. B23K 31/02; B23K 37/06; B23P 15/04
[52] U.S. Cl. ............ 228/212; 228/215; 228/262.3; 228/246; 228/250; 29/889.21
[58] Field of Search .......................... 228/212, 214, 228/215, 216, 262.3, 262.31, 50, 246, 250; 164/127; 29/889.21

[56] References Cited

U.S. PATENT DOCUMENTS

| | | | |
|---|---|---|---|
| 4,726,104 | 2/1988 | Foster et al. .................... 29/889.1 |
| 4,874,290 | 10/1989 | Cang et al. ..................... 415/173.4 |
| 5,156,321 | 10/1992 | Liburdi et al. .................. 228/119 |
| 5,395,584 | 3/1995 | Berger et al. ................... 420/443 |
| 5,636,439 | 6/1997 | Cunha et al. . | |

*Primary Examiner*—Samuel M. Heinrich
*Attorney, Agent, or Firm*—Burns, Doane, Swecker & Mathis, L.L.P.

[57] ABSTRACT

A method of applying a surface coating to a stator vane (1) of a gas turbine, the stator vane (1) comprising a platform (3) with an outer surface (4) connected to the stator of the gas turbine and an airfoil (2) connected to the platform (3), the method comprising the steps of each stator vane (1) is provided as a singlet, a base layer coating (7) affording resistance to oxidation is applied to surfaces of said stator vane (1) and said outer surface (4) of the platform (3) to be exposed to hot gases of the gas turbine, and a top layer coating (8) affording thermal resistance is applied to all coated surfaces of said stator vane (1) and the outer surface (4) of the platform (3), and welding the stator vanes (1) together, wherein a welding filler material (10) is placed between said walls of two adjacent platforms (3) of said stator vane (1), welding said singlets to one another at the margins of walls of said platform (3) to said welding filler material (10).

16 Claims, 6 Drawing Sheets

METHOD FOR COATING AND WELDING STATOR VANES OF A GAS TURBINE

FIELD OF INVENTION

The invention relates to a method for coating and welding stator vanes of a gas turbine.

BACKGROUND OF THE INVENTION

It is known from the state of the art to form the vanes of a gas turbine as singlets to be connected to the stator of a gas turbine. Because the vanes are exposed to the hot gases of the gas turbine, for reasons of improving overall performance and efficiency, the vanes have to be coated with coating materials different than the base material from which the vanes are manufactured. It is generally known from the state of the art to use MCrAlY as a bond layer coating to provide a resistance to oxidation and corrosion to the base material. On top of this bond coating, there is applied a second or top coating of yttrium stabilized zirconia having thermal insulating and anti-corrosion properties.

These coatings are typically applied by a plasma spray head. However due to the complex geometry it is very difficult to spray more then one vane at a time. The coating of each vane has the known advantage that it is possible to coat each single vane in the same quality and at a uniform thickness at all the surfaces exposed to the hot gases in comparison to a multi-vane-segment, where due to the geometry only portions can fully be coated to the desired coating thickness and often portions of the vane are only coated with one of both or even remain uncoated. This would immediately lead to undesirable temperature variations along the surface of the vane. For that reason from patent U.S. Pat. No. 5,636,439 a method is known for providing a nozzle segment as a singlet, applying to each singlet a bond and a top layer coating, and then securing two nozzle segments to one another by welding margins of adjacent walls to one another. This is done by butting the margins of the inner walls of adjoining segments against one another whereby the welding includes fusing the material of the butting margins in a direction along that margins terminating shortly before the coated wall surfaces such that said wall surfaces and the base and top coatings there along are not penetrated by fused material. The distance between the coated surfaces and the fused material might be less than 8 mils. The problem with that state of the art occurs due to the fact that during the solidification after welding microcracks are formed in the base material. The microcracks may range from 500 microns to more than 1 millimetre. Such microcracks constitute a zone of such weakness that they can not be allowed in the component, even in moderately loaded areas. Cracks may start growing immediately at this point of weakness. However, the material of choice for a particular vane application is seldom based on its weldability but rather the castability, high temperature strength and environmental resistance. Hence, it will often be the case that the material from which vanes are manufactured is not easily or acceptably weldable. However, the step of welding is desirable because it clearly reduces the leakage of the cooling air through the margins of two adjacent vanes and so the overall efficiency of the gas turbine is increased.

SUMMARY OF THE INVENTION

It is the object of the present invention to find a method of coating and welding stator vanes of a gas turbine, provided as singlets, to one another without the deleterious effect of producing microcracks at the welding joint during solidification after welding.

According to the invention a method was found of applying a surface coating to a stator vane of a gas turbine, the stator vane comprising a platform with an outer surface connected to the stator of the gas turbine and an airfoil connected to the platform, the method comprising the steps of each stator vane is provided as a singlet, a base layer coating affording resistance to oxidation is applied to surfaces of said stator vane and said outer surface of the platform to be exposed to hot gases of the gas turbine, and a top layer coating affording thermal resistance is applied to all coated surfaces of said stator vane and the outer surface of the platform, and welding the stator vanes together, wherein a welding filler material is placed between said walls of two adjacent platforms of said stator vane, welding said singlets to one another at the margins of walls of said platform to said welding filler material.

The welding filler material between two platforms of stator vanes reduces the formation of micro-cracks during solidification after welding. This method will increase the resistance against the thermal stresses and the forming of microcracks with the result of a significant lifetime increase. For that purpose a welding filler material which is different from the parent material is appropriate while it has no harmful effect on the physical properties of the adjoining vanes in the region of the welding joint. The problem of microcracks occurs especially where the parents material of a stator vane is a nickel based superalloy such as MAR-M247. As an example the welding filler material might be IN625, which has adequate properties like high temperature strength.

The coating material of the stator vane and the side of the platform which is exposed to the hot gases of the gas turbine is with advantage MCrAlY as a base layer coating to provide a resistance to oxidation and corrosion and Y stabilised Zr-Oxide having thermal insulating and anti-corrosion properties. To avoid any deleterious effects of degrading the base or the top layer coating by overheating during welding only those parts of the adjacent walls of the platforms will be welted together which are far away enough from the coating material. It might be advantageous to have on one or both parts a sealing slot cast into the wall to prevent the leaking of molten welding material from coming into contact with the coating. For the method according to the invention any method of welding might be useful, especially electrobeam-, laser- or TIG-welding. To accommodate the welding filler material between the two stator vanes without generating a gap at the surfaces of the coated platform which would happen due to the additional material it might be an advantage to employ two corresponding castings which leaves a space or step where said welding filler material can be accommodated.

Further more, it might be advantageous to place a sealing plate in this sealing slot for different reasons. The first reason is to avoid molten welding material coming from the welding joint from harming the coating. The second reason is to avoid a leak of cooling air in case the welding joint is partially cracked during service.

With the method according to the invention any single vane can be coated with the protective base and top layer to a full extent and then welded together. The leakage of the cooling air which escapes between the two vanes can be significantly reduced due to the sealing effect of the weld.

BRIEF DESCRIPTION OF DRAWINGS

This invention is illustrated in the accompanying drawing, in which.

The drawings show only the parts important for the invention. Same elements will be numbered in the same ways in different drawings.

DETAILED DESCRIPTION OF THE INVENTION

Figure 1A:
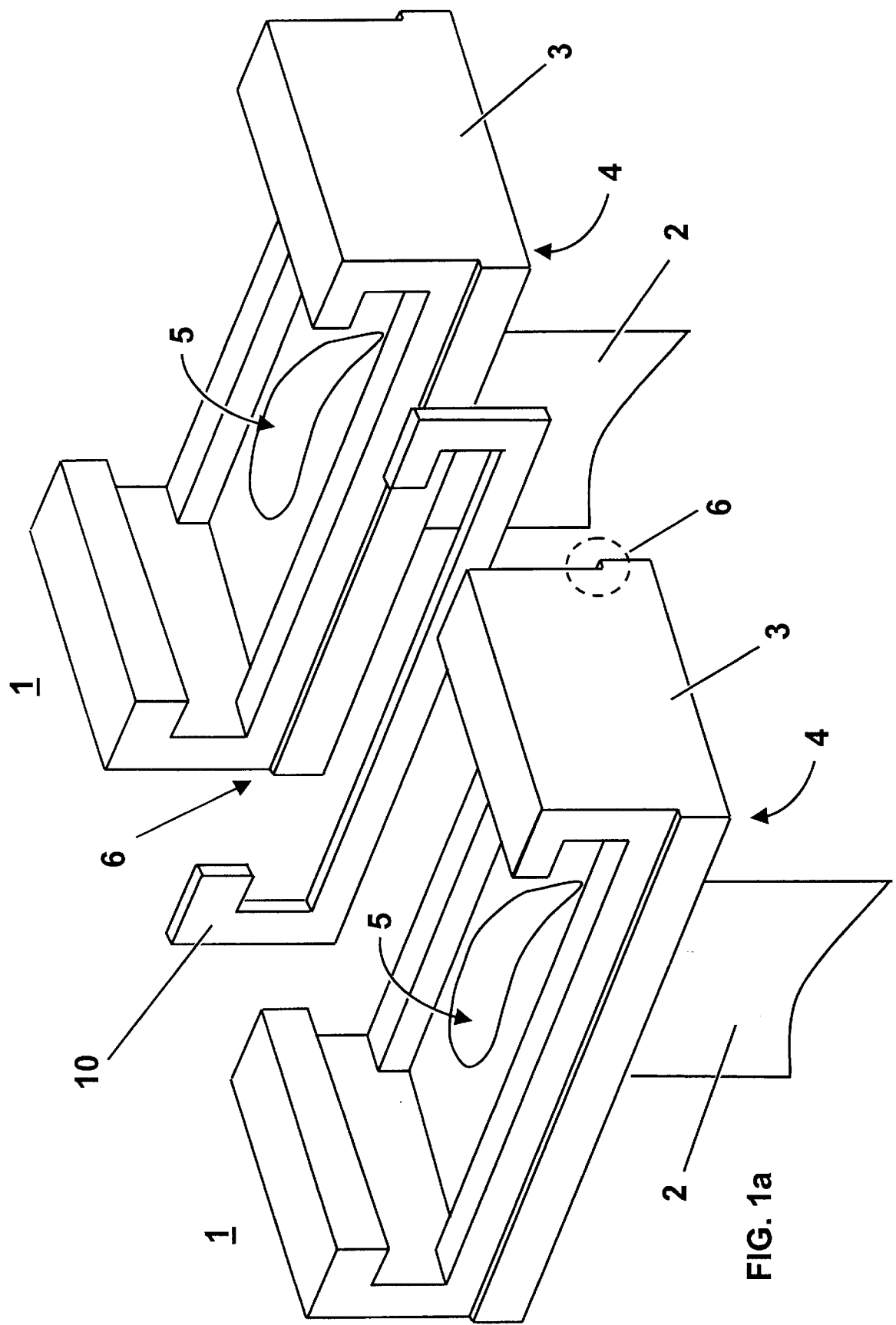
FIG. 1a is a perspective view of two gas turbine vanes provided as singlets.

As shown in FIG. 1a two gas turbine vanes 1 are provided as singlets. Each vane 1 comprising a platform 3 and an airfoil 2 connected to the platform 3. Within the platform 3 and the airfoil 2 there is a cooling system 5 which is not illustrated in detail in FIG. 1a but which is essentially known from the prior art and which receives a cooling medium to cool the airfoil 2 as well as the platform 3. The airfoil 2 and the outer surface 4 of the platform 3 of each singlet will be coated separately with two layers of coating, a base layer coating 7 providing resistance to oxidation and a top layer coating 8 having thermal insulating and anti-corrosion properties. Both coatings are not shown in FIG. 1a but will be illustrated in FIG. 3a,b,c. Providing the segments as doublets or triplets, coating all of the hot gas path surfaces desired to be cooled and applying a uniform coating to the segments is practically impossible by using currently available spraying techniques. That is, if applied to doublets or triplets, the coating would be uneven, and would be of non-uniform thickness. Additionally, portions of the segments would be left uncoated due to the line-of-sight requirements of applying thermal spraying techniques to these complicated, complex structures. However, when single parts are coated separately, coatings may be applied to all desired surfaces and the uniform thickness.

After coating the singlets they will welded together whereby a welding filler material 10 is placed between the two singlets. In the FIG. 1a there is provided a step 6 at adjoining walls of the vanes 1 for the welding filler material 10 to be accommodated. The step 6 is advantageous but not necessary for the method according to the invention.

Figure 1B:
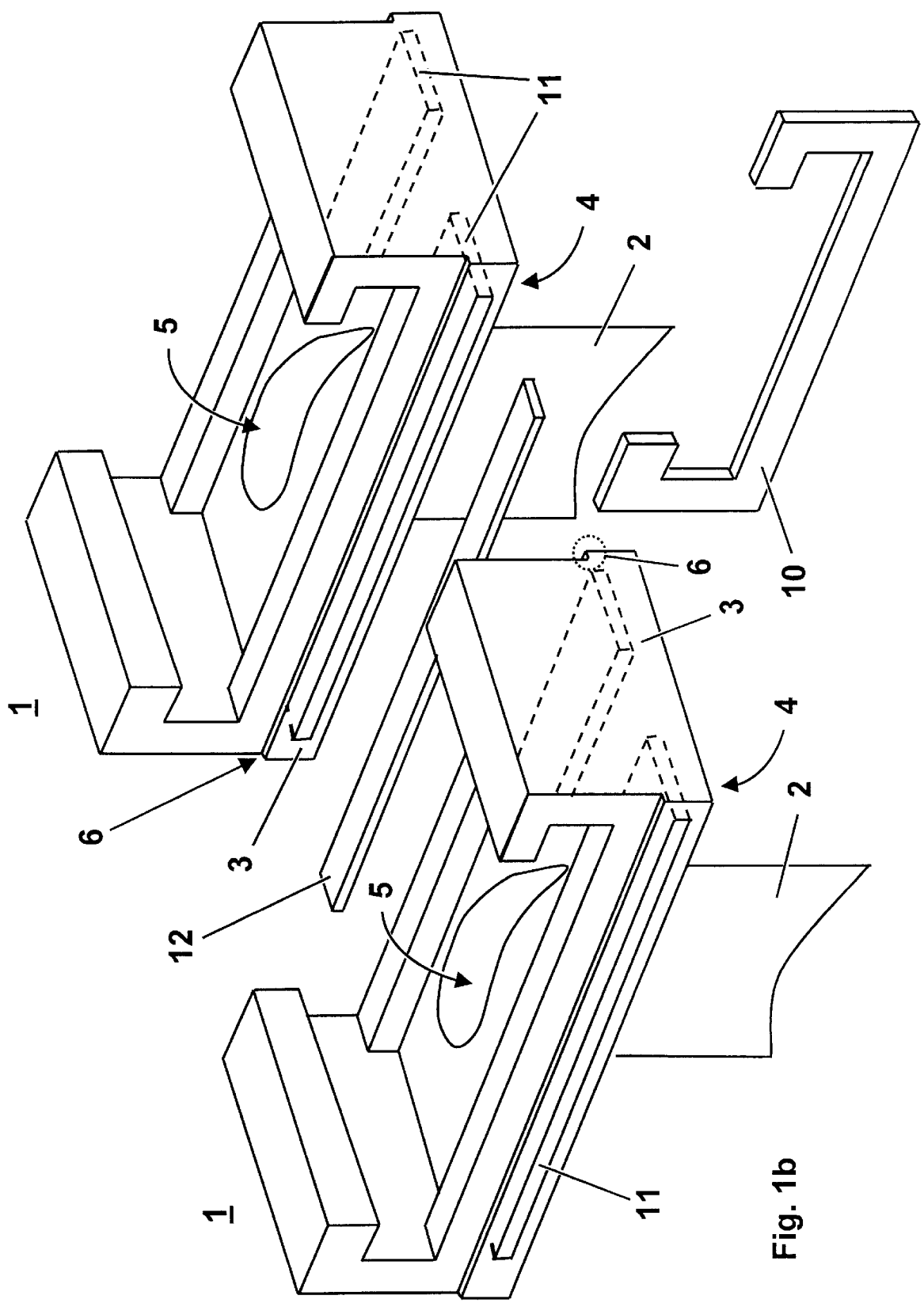
FIG. 1b is a perspective view of another embodiment of two gas turbine vanes provided as singlets.

FIG. 1b shows in principal the same embodiment of the invention with two vanes 1 comprising a plafform 3, an airfoil 2 and a welding filler material 10 to be placed in between two adjoining walls of the vane 1 with a step 6 within these walls. But in addition to FIG. 1a there is a sealing slot 11 in the platform 3 between the step 6 and the outer surface 4 at both adjoining sides of the vane 1. Before both vanes are butted together, the sealing slot 11 is filled with a sealing plate 12.

Figure 2A:
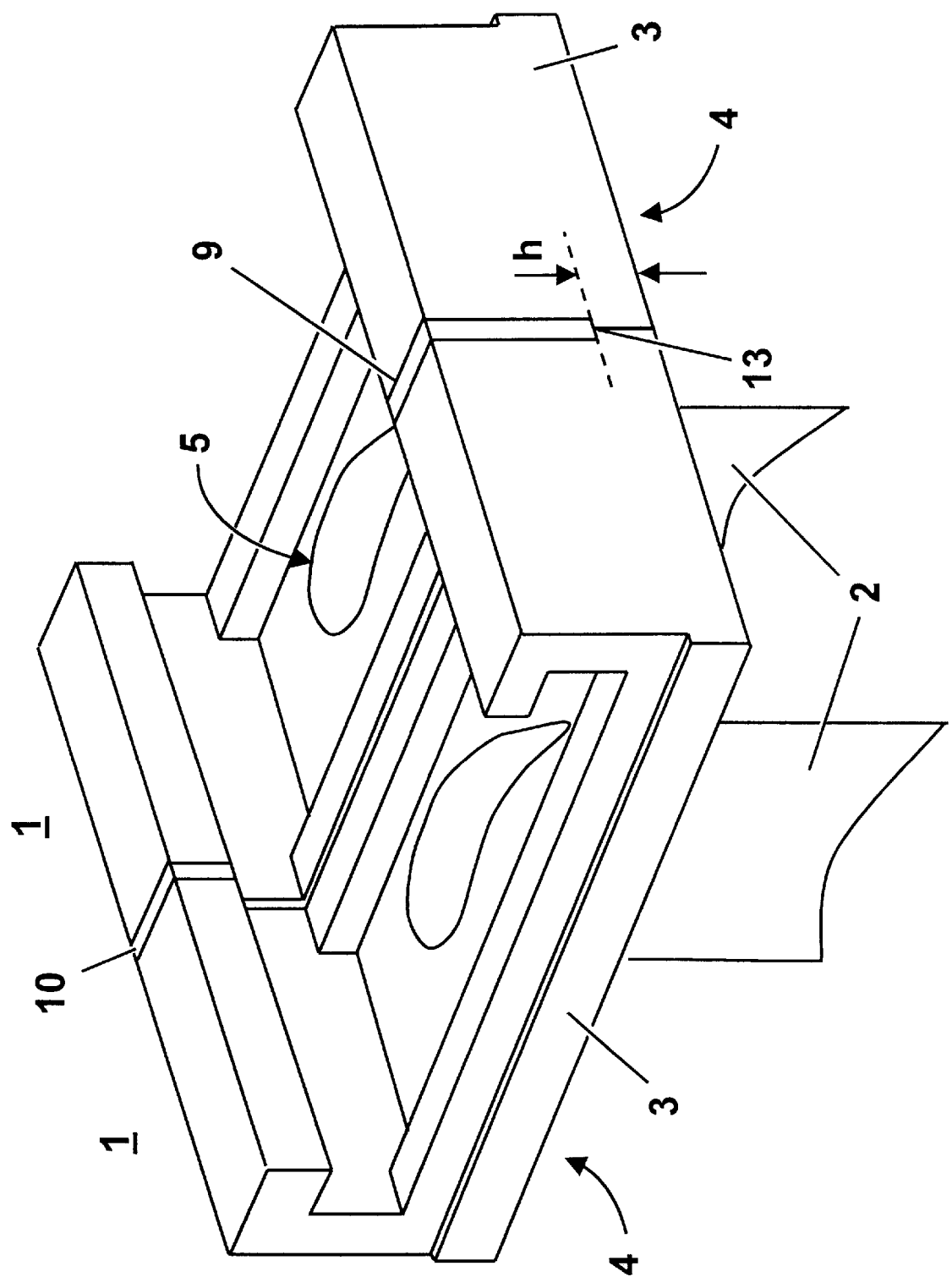
FIG. 2a is a perspective view of a third embodiment showing the gas turbine vane doublet welded to one another from two singlets.

FIG. 2a illustrates the two vanes 1 of a gas turbine welded together as a doublet in accordance with FIG. 1a. The welding zone 9 is made between the wall of a vane 1 and the welding filler material 10. To avoid a damage of the coated outer surface 4 of the platform 3 due to the welding there is a distance h between an apex 13 (which is in correspondents with the step 6) at the lower end of the welding filler material 10 and the outer surface 4.

Figure 2B:
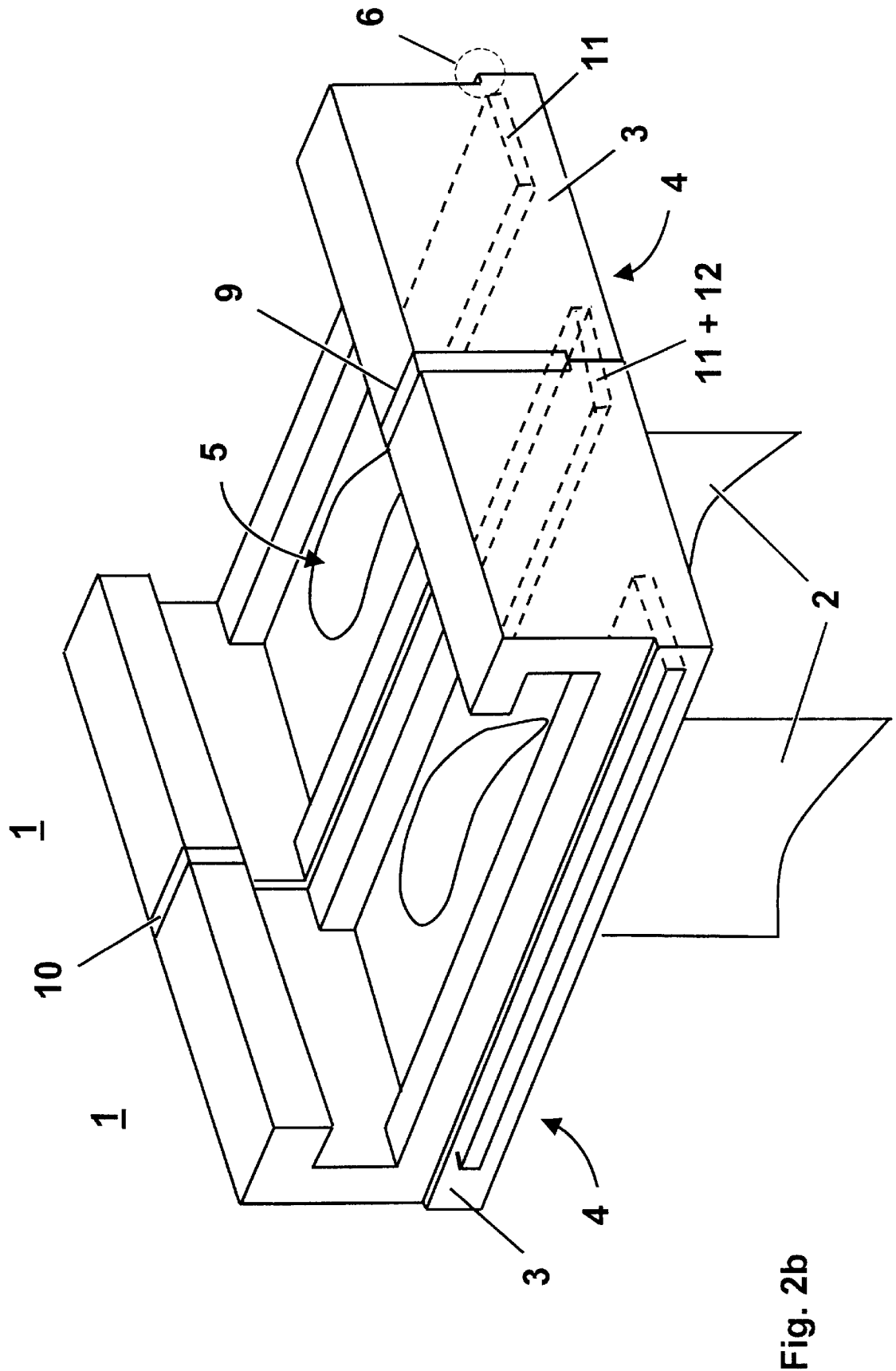
FIG. 2b is a perspective view of another embodiment of gas turbine vane doublet welded to one another from two singlets.

FIG. 2b illustrates the two vanes 1 of a gas turbine welded together as a doublet in accordance with FIG. 1b. The welding zone 9 is made between the wall of a vane 1 and the welding filler material 10 but in difference with the FIG. 2a the sealing plate 12 incorporated in the sealing slot 11 (shown as dotted lines) prevents the leaking of molten welding material to the outer surface 4 on one side and on the other side reduced the leakage of the cooling medium from the cooling system 5 during services of the multi-segment vane.

Figure 3A:
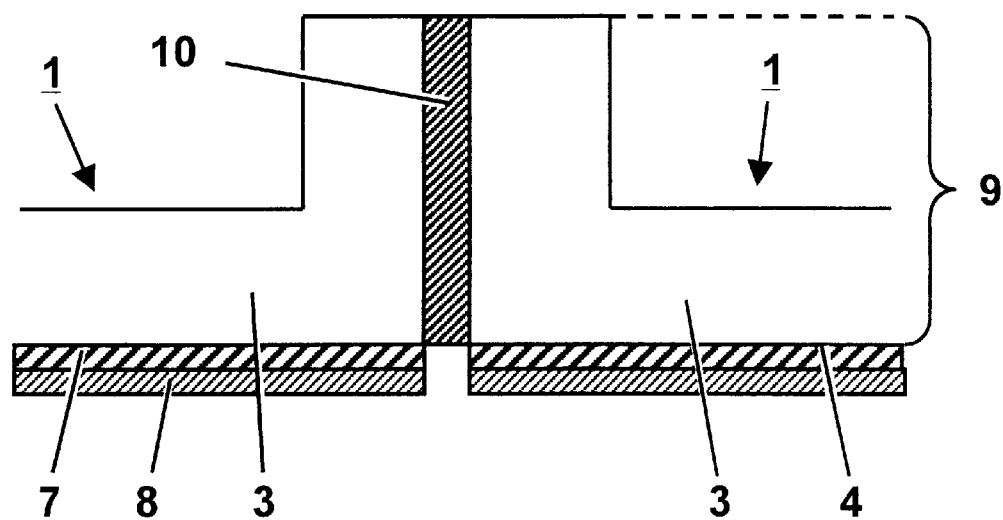
FIG. 3a is a cross section through a welding joint at the wall of a platform of two adjoining gas turbine vane singlets with a welding filler material in between, FIG. 3b is a section through an other form of a welding joint at the wall of a platform of two adjoining gas turbine vane singlets with a welding filler material in between and FIG. 3c a cross section through a welding joint at the wall of a platform of two adjoining gas turbine vane singlet with a welding filler material in between and a seal slot between welding joint and coating material, and an additional sealing plate within the seal slot.

A cross section of the adjacent walls of the platform 3 of two stator vanes 1 is illustrated by FIG. 3a, the platform 3 comprising a outer surface 4 exposed to the hot gases. Both outer surfaces 4 and the airfoil 2, the airfoil 2 is not shown in FIG. 3a, are coated with a base layer coating 7 provided resistance to oxidation and a top layer 8 coating having thermal insulating and anti-corrosion properties at the outer surface 4. The coating material of the stator vane 1 is with advantage MCrAlY as a base layer coating 7 and Y stabilised Zr-Oxide as a top layer coating 8. According to FIG. 3a the welding filler material 10 is placed between the two platforms 3 of stator vanes 1. In principle the welding region is marked with 9. The welding filler material 10 reduces the production of micro-cracks during solidification after welding. This method will increase the resistance against the thermal stress and that forming of microcracks with the result of a significant lifetime increase. For that purposes a welding filler material 10 which is different from the parent material is appropriate while it has no harmful effect on the physical properties of the adjoining vanes 1 in the region of the welding joint 9. To achieve the purpose of a reduction of the micro-cracks the welding filler material 10 should have at least a thickness of 1/10 millimetre. The problem of microcracks occurs especially where the parent material of a stator vane is a nickel base superalloy such as MAR-M247. As an example the welding filler material 10 might be IN625. Table 1 shows the contents of these materials.

Contents of materials (wt.-%)

TABLE 1

|          | Cr   | Co   | Mo    | W      | Ta   | Al   | Ti   |
|----------|------|------|-------|--------|------|------|------|
| MAR-247  | 8.4  | 10.0 | 0.7   | 10.0   | 3.0  | 5.5  | 1.0  |
| IN 625   | 21.5 | —    | 8.5   | —      | —    | 0.5  | 0.2  |

|          | Hf   | C    | B     | Zr     | Ni   | Fe   | Nb   |
|----------|------|------|-------|--------|------|------|------|
| MAR-247  | 1.3  | 0.15 | 0.015 | 0.0045 | bal. | —    | —    |
| IN 625   | —    | 0.06 | —     | —      | bal. | 2.5  | 4.0  |

Due to the welding filler material 10 in FIG. 3a shows a gap between the two adjacent outer surfaces 4 of the stator vanes 1. The non coated gap can be harmed in respect to the hot environment, but the resistance properties of the welding filler material 10 should be sufficient to avoid oxidation.

Figure 3B:
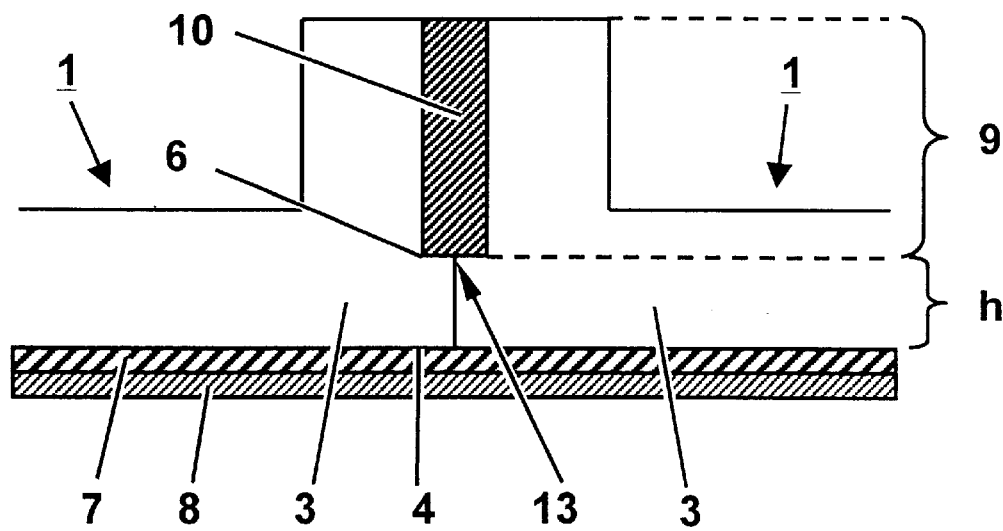

A cross section of the adjacent walls of the platform 3 of two stator vanes 1 is illustrated by FIG. 3b, with is an embodiment according to FIG. 2a. To avoid any deleterious effects of degrading either the base or the top layer coatings 7,8 due to overheating during welding only those parts of the adjacent walls of the platforms 3 will be welded together which are far away enough from the coating material 7,8. Thus, the method according to the invention includes butting the margins of the wall of adjoining vane 1 platforms 3 against one another and the step of welding includes fusing the material of the butting wall margins in radial inward direction along said margins terminating shortly before said wall surfaces 4 such that said wall surfaces of the platform 3 and the base and the top layer coating 7,8 there along are not penetrated by fused material. The distance h from the apex 13 of the welding joint 9 to the outer surface 4 is indicated in FIG. 3b by a strait line. Preferably, the depth h in a radial direction is 8 millimetres or less and greater than 1 millimetre to prevent that disruption as well as to prevent propagation of an opening or crack during the life cycle of the gas turbine. That is, if the depth h is greater than 8 millimetres, there would be a potential for a crack to develop between the segments. For the embedding of the welding filler material 10 without generating a gap between joining walls there might be a cast or machined a step 6 in which the welding filler material 10 can be placed. The step 6 is useful as well for fixturing the segments relative to one another during welding.

For the method according to the invention any method of welding might be useful, especially electrobeam-, laser- or TIG-welding.

Figure 3C:
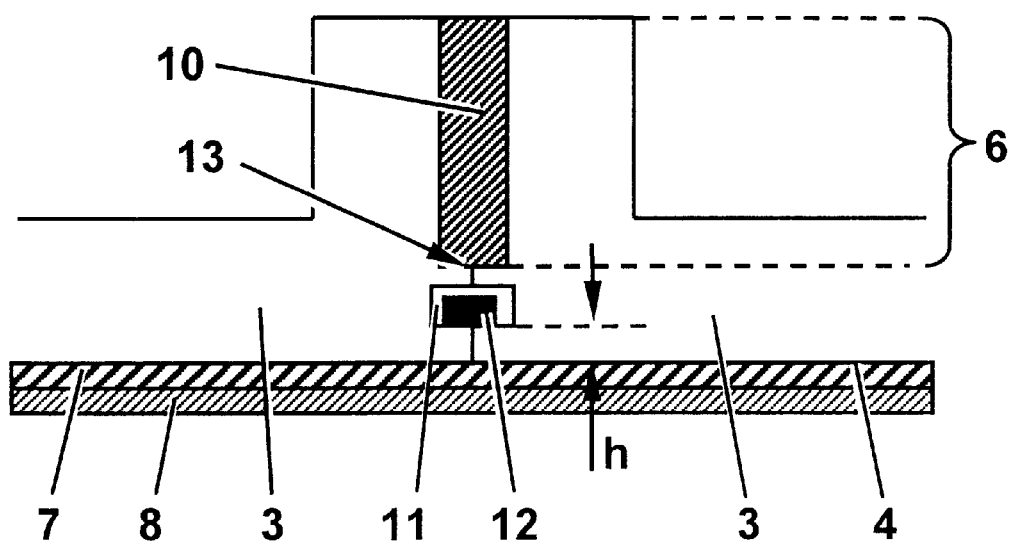

A cross section of the adjacent walls of the platform 3 of two stator vanes 1 is illustrated by FIG. 3c, which is an embodiment according to FIG. 2b. It might be advantageous to have on the wall of one or both parts a sealing slot 11 which may be cast or machined in between the apex 13 and the outer surface 3 at both adjoining walls preventing leaking molten welding material from coming into contact with the coating material 7,8. As seen in FIG. 3c there is placed a sealing plate 12 in this sealing slot 11 for different reasons. The first reason for placing a sealing plate 12 in the sealing 11 is to assure in a better way that fused welding material does not harm the base layer coating 7 which comes from the welding joint during welding and the sealing plate 12 stops as well the welding energy from penetrating to the coatings more effectively than the base material of the vanes. The second reason is to avoid a leak of cooling air in case the welding joint is not sealed in a proper manner. The sealing material has to have high thermal resistance. For this purpose a material like Hastelloy X, Haynes 214 or PM 2000 has good properties.

Contents of possible sealing materials (wt.-%)

TABLE 2

|  | Cr | Co | Mo | W | Al | C | B | Zr |
|---|---|---|---|---|---|---|---|---|
| Hastelloy X | 21.0 | 1.5 | 9.0 | 0.6 | — | 0.2 | — | — |
| Haynes 214 | 16.0 | — | — | — | 4.5 | 0.05 | 0.01 | 0.1 |
| PM2000 | 19.0 | — | — | — | 5.5 | — | — | — |

|  | Fe | Ni | Fe | Y | Si | Mn | $Y_2O_3$ | Ti |
|---|---|---|---|---|---|---|---|---|
| Hastelloy X | 18.5 | bal. | 18.5 | — | — | — | — | — |
| Haynes 214 | 3.0 | bal. | 3.0 | 0.01 | 0.2 | 0.5 | — | — |
| PM2000 | — | — | bal. | — | — | — | 0.5 | 0.5 |

With the method according to the invention any single vane can be coated with the protective base and top layer and welded thereafter such that the leakage of the cooling air which escapes due to the weld joint between two adjacent vanes can be significantly reduced.

While the invention has been described in connection with what is presently considered to be the most practical and preferred embodiment, it is understood that the invention is not to be limited to the disclosed embodiment, but on the contrary, is intended to cover various modifications and equivalent arrangements included within the spirit and scope of the appended claims.

What is claimed is:

1. A method of applying a surface coating to a stator vane of a gas turbine, the stator vane comprising a platform with an outer surface connected to the stator of the gas turbine and an airfoil connected to the platform, the method comprising the steps of (a) each stator vane is provided as s singlet, (b) a base layer coating affording resistance to oxidation is applied to surfaces of said stator vane and said outer surface of the platform to be exposed to hot gases of the gas turbine, and a top layer coating affording thermal resistance is applied to all coated surfaces of said stator vane and the outer surface of the platform, and (c) welding the stator vanes together, wherein (d) a welding filler material is placed between said walls of two adjacent platforms of said stator vane, (e) welding same singlets to one another at the margins of walls of said platform to said welding filler material.

2. Method according to claim 1, wherein the thickness of the welding filler material is at least 1/10 millimeter.

3. Method according to claim 1, wherein the margins of the wall of adjoining vane platforms are butted against one another and the step of welding includes fusing the material of the wall/welding filler material margins in radial inward direction along said margins terminating short before said wall surfaces at an apex such that said wall surfaces of the platform and the base and the top coating there along are not penetrated by fused material.

4. Method according to claim 3, wherein the fused material is controlled such that a depth of unfused material of less than 8 millimeters between fused material at said apex and the outer surface of said platform coated is maintained.

5. Method according to claim 1, wherein a step is cast or machined into adjacent walls in the vane and the welding filler material is embedded therein before welding the walls of the platforms and the welding filler material together.

6. Method according to claim 1, wherein the base material of each stator vane is a nickel base superalloy.

7. Method according to claim 6, wherein the base material of each stator vane is MAR-M247 containing (wt-%) 8.4% Cr, 10.0% Co, 0.7% Mo, 10.0% W, 3.0% Ta, 5.5% Al, 1.0% Ti, 1.3% Hf, 0.15% C, 0.015% B, 0.0045% Zr, Rest Ni and unavoidable impurities.

8. Method according to claim 1, wherein the welding filler material is IN 625 containing (wt-%) 21.5% Cr, 8.5% Mo, 0.5% Al, 0.2% Ti, 0.06% C, 2.5% Fe, 4.0% Nb, Rest Ni and unavoidable impurities.

9. Method according to claim 1, wherein the base layer coating comprises an alloy of principally nickel, chromium, aluminum and yttrium.

10. Method according to claim 1, wherein said top layer coating comprises yttrium stabilised zirconia.

11. Method according to the claim 1,
wherein the welding takes place by TIG, electro-beam or laser-beam welding.

12. Method according to claim 1, wherein a seal slot is provided in one or both of the adjoining margins of butting walls of the platform placed between the coated surface of the platform and said apex o the welding filler material.

13. Method according to claim 12, wherein a sealing plate is placed in the seal slot before applying the welding step steps takes place, the sealing plate consisting of a material with high thermal resistance.

14. Method according to the claim 13,
    wherein the sealing plate is Hastelloy X containing (wt.-%) 21.0% Cr, 1.5% Co, 9.0% Mo, 0.6% W, 0.2% C, 18.5% Fe, Rest Ni and unavoidable impurities.

15. Method according to the claim 13,
    wherein the sealing plate is Haynes 214 containing (wt.-%) 16.0% Cr, 4.5% Al, 0.05% C, 0.01% B, 0.1% Zr, 3.0% Fe, 0.01% Y, 0.2% Si, 0.5% Mn, Rest Ni and unavoidable impurities.

16. Method according to the claim 13,
    wherein the sealing plate is PM2000 containing (wt.-%) 19.0% Cr, 5.5% Al, 0.5% $Y_2O_3$, 0.5% Ti, Rest Fe and unavoidable impurities.

* * * * *